US011799256B2

(12) United States Patent
Zhang et al.

(10) Patent No.: US 11,799,256 B2
(45) Date of Patent: *Oct. 24, 2023

(54) ELECTRICAL CONNECTION DEVICE

(71) Applicant: SHANGHAI DIANBA NEW ENERGY TECHNOLOGY CO., LTD., Shanghai (CN)

(72) Inventors: Jianping Zhang, Shanghai (CN); Chunhua Huang, Shanghai (CN)

(73) Assignee: SHANGHAI DIANBA NEW ENERGY TECHNOLOGY CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/538,265

(22) Filed: Nov. 30, 2021

(65) Prior Publication Data

US 2022/0094125 A1 Mar. 24, 2022

Related U.S. Application Data

(63) Continuation of application No. 16/468,359, filed as application No. PCT/CN2017/115578 on Dec. 12, 2017, now Pat. No. 11,223,174.

(30) Foreign Application Priority Data

Dec. 12, 2016 (CN) .......................... 201611137605.0

(51) Int. Cl.
*H01R 35/02* (2006.01)
*B60R 16/02* (2006.01)
(Continued)

(52) U.S. Cl.
CPC .......... *H01R 35/02* (2013.01); *B60R 16/0207* (2013.01); *H01R 13/17* (2013.01); *H01R 13/33* (2013.01); *H01R 2201/26* (2013.01)

(58) Field of Classification Search
CPC ........ H01R 35/02; H01R 13/17; H01R 13/33; H01R 2201/26; B60R 16/0207
See application file for complete search history.

(56) References Cited

U.S. PATENT DOCUMENTS

| 11,223,174 B2 * | 1/2022 | Zhang ..................... H01R 13/17 |
| 2014/0191921 A1 * | 7/2014 | Yang ....................... H01Q 1/362 |
| | | 343/872 |

(Continued)

FOREIGN PATENT DOCUMENTS

CN 203929824 U * 11/2014
JP S63159287 * 7/1988

*Primary Examiner* — Peter G Leigh
*Assistant Examiner* — Nader J Alhawamdeh
(74) *Attorney, Agent, or Firm* — B. Aaron Schulman, Esq.; Stites & Harbison, PLLC

(57) ABSTRACT

Provided is an electrical connection device (1) including a connector (2) having a hollow connecting cavity (21), each of two opposite sides of the connecting cavity is connected to a conductive plug (22) electrically coupled with the connecting cavity (21). The connecting cavity (21) is form by a plurality of flexible conductive materials. When in use, the grid-like connecting cavity (21) made of the flexible conductive materials can be elongated, compressed, or radially twisted, and is adaptive to changes in relative displacement at various angles at various angles in the axial direction or radial direction between different electrical connecting bases, thereby preventing degradation of performance of electrical connection due to the changes in relative displacement.

18 Claims, 5 Drawing Sheets

(51) Int. Cl.
*H01R 13/17* (2006.01)
*H01R 13/33* (2006.01)

(56) References Cited

U.S. PATENT DOCUMENTS

| | | | |
|---|---|---|---|
| 2017/0301600 A1* | 10/2017 | Frank | H05K 7/1432 |
| 2018/0076585 A1* | 3/2018 | Harris, III | H01R 13/17 |
| 2020/0259302 A1* | 8/2020 | Zhang | H01R 13/6315 |

\* cited by examiner

ELECTRICAL CONNECTION DEVICE

CROSS REFERENCE TO RELATED APPLICATION

This application is a Continuation Application of U.S. application Ser. No. 16/468,359, which is a national phase entry under 35 USC § 371 of International Application PCT/CN2017/115578, filed Dec. 12, 2017, which is based on and claims a priority to Chinese Patent Application Serial No. 201611137605.0, filed Dec. 12, 2016, the entire contents of which are incorporated herein by reference.

FIELD

The present disclosure relates to an electrical connector for an electric vehicle, and more particularly to a flexible electrical connection device.

BACKGROUND

In a small space of an electric vehicle, conductive copper bars and flexible wires and the like are usually employed in connection between two conductors. Such connection methods are mostly rigid connections with poor buffering performance and high probability of failure, resulting in a fault of the electric vehicle.

SUMMARY

In order to solve the above problems, the present disclosure provides an electrical connection device for electrical connection between different conductors, including:

a connector having a hollow connecting cavity formed by a plurality of flexible conductive materials, and each of two opposite sides of the connecting cavity being connected to a conductive plug electrically coupled with the connecting cavity.

As a preferable embodiment of the present disclosure, the connecting cavity is a spherical-like elastic connecting cavity surrounded by the plurality of flexible conductive materials.

As a preferable embodiment of the present disclosure, the connecting cavity is a spherical-like elastic connecting cavity surrounded by a grid-like flexible conductive material.

As a preferable embodiment of the present disclosure, the connecting cavity is interwoven from metal wires or formed by stretching a metal conductive tape.

As a preferable embodiment of the present disclosure, the connecting cavity is electrically connected to the conductive plug by crimping or welding.

As a preferable embodiment of the present disclosure, one end of the conductive plug extends into the connecting cavity, and a spring is disposed between ends of two conductive plugs extending into the connecting cavity.

As a preferable embodiment of the present disclosure, the spring is a compression spring.

As a preferable embodiment of the present disclosure, the conductive plug is a columnar conductive plug or a cylindrical conductive plug, an outer surface of the columnar conductive plug defines one or more spring annular grooves provided with a separable annular conductive springs therein, an inner surface of the cylindrical conductive plug defines one or more spring annular grooves provided with a separable annular conductive spring therein.

As a preferable embodiment of the present disclosure, an outer wall of the columnar conductive plug or an inner wall of the cylindrical conductive plug further defines one or more sealing annular grooves located between the one or more spring annular grooves and the connecting cavity, and the one or more sealing annular grooves are provided with a separable sealing ring therein.

As a preferable embodiment of the present disclosure, the electrical connection device further comprises a pair of connecting bases located at two sides of the connector, and each of the pair of connecting bases comprises a base body provided with a base cavity or a protruding column, the base cavity has a space for receiving the columnar conductive plug and is in contact with the conductive spring at an outer surface of the conductive plug, and the protruding column is inserted into the cylindrical conductive plug and is in contact with the conductive spring at an inner wall of the cylindrical conductive plug.

The technical effects that can be achieved by the present disclosure are provided as follows.

1. The grid-like connecting cavity of the present disclosure is made of a flexible conductive material. The connecting cavity can be elongated or compressed and radially twisted in use, and can be adaptive to changes in relative displacement at various angles in the axial direction or radial directions between different electrical connecting bases, thereby preventing degradation of performance of electrical connection due to the changes in relative displacement.
2. The conductive plug of the present disclosure is provided with an annular conductive spring, which further enhances the electrical connection effect between the connector and the connecting base and improves conductivity.
3. The electrical connection device of the present disclosure may be applied to electrical connection between two sockets under severe shaking conditions.

BRIEF DESCRIPTION OF THE DRAWINGS

In order to illustrate the embodiments of the present disclosure or the technical solutions in the prior art more clearly, the drawings used in the embodiments or the description of the prior art will be briefly described below. Obviously, the drawings in the following description are only some of the embodiments of the present disclosure, and those skilled in the art can obtain other drawings based on the provided drawings, without inventive work.

REFERENCE NUMERALS

Figure 1:
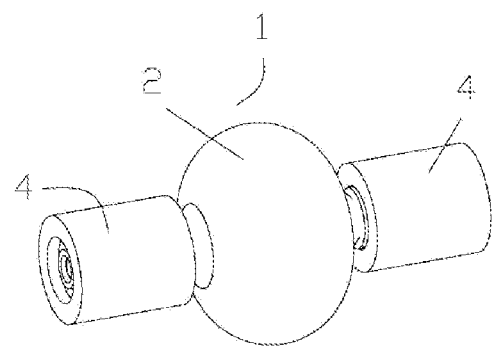
FIG. 1 is a perspective view of an electrical connection device according to an embodiment of the present disclosure.
Figure 2:
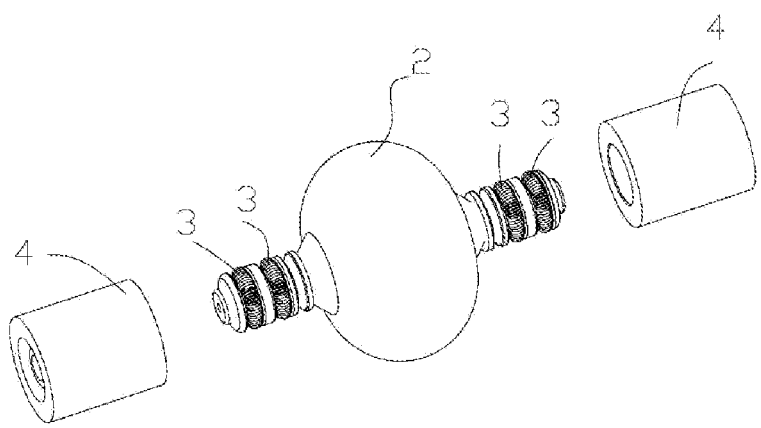
FIG. 2 is an exploded perspective view of the electrical connection device in FIG. 1.
Figure 3:
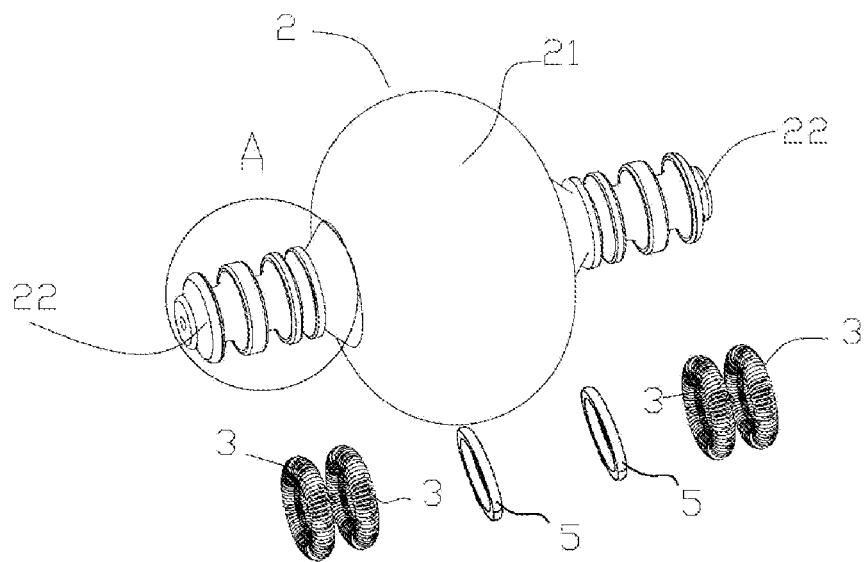
FIG. 3 is a further exploded perspective view of the electrical connection device in FIG. 2.
Figure 4:
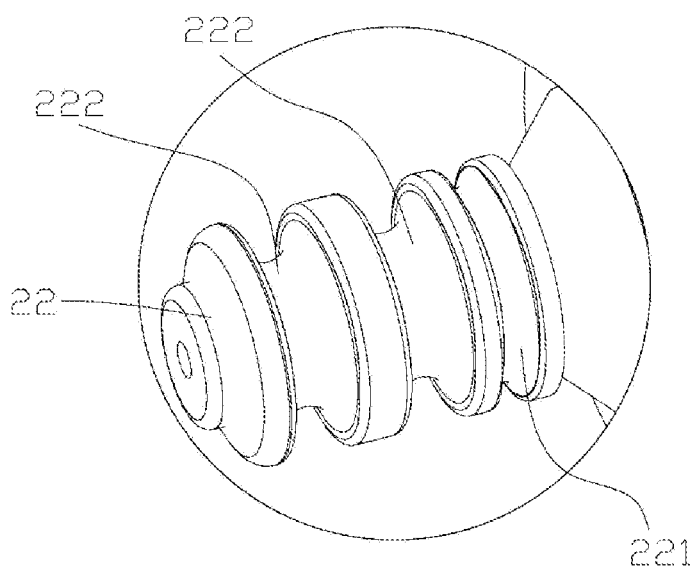
FIG. 4 is a detailed enlarged view of portion A in FIG. 3.
Figure 5:
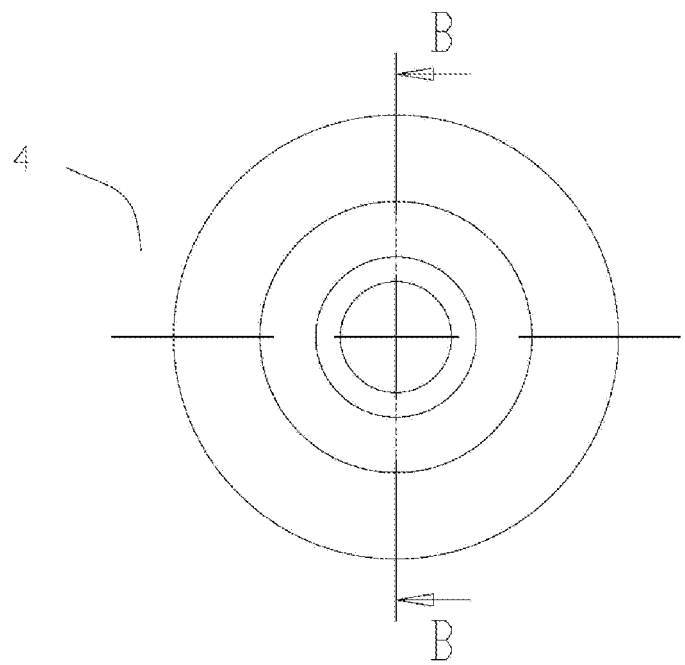
FIG. 5 is a schematic view of a connecting base of the electrical connection device in FIG. 2.
Figure 6:
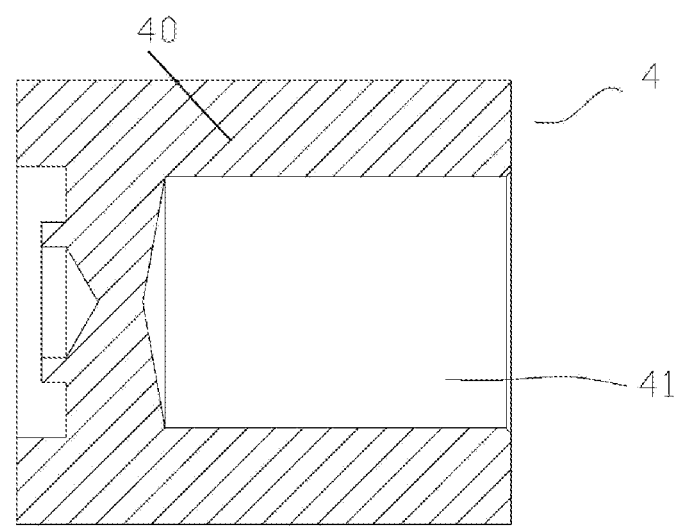
FIG. 6 is a sectional view of the connecting base taken along line B-B in FIG. 5.

1: electrical connection device; 2: connector; 21: connecting cavity; 22: conductive plug; 220: cylindrical conductive plug; 221: sealing annular groove; 222: spring annular groove; 223: end of the conductive plug; 23: spring; 3: conductive spring; 4: connecting base; 40, 400: base body; 41: base cavity; 401: protruding column; 5: sealing ring.

DETAILED DESCRIPTION

Preferable embodiments of the present disclosure are described below in detail with reference to the accompanying drawings, in which the advantages and features of the disclosure can be more easily understood by those skilled in the art, thereby limit the scope of protection of the present disclosure more clearly.

As shown in FIGS. 1 to 6, the electrical connecting device 1 in an embodiment of the present disclosure includes a connector 2 and a pair of connecting bases 4. The connector 2 has a hollow connecting cavity 21 which is provided a spring 23 therein, and preferably, the spring 23 is a drum-shaped compression spring.

A protruding columnar conductive plug 22 is disposed on each of opposite sides of the connecting cavity 21. One end 223 of the protruding columnar conductive plug 22 extends into the connecting cavity 21, and two ends of the spring 23 are respectively connected to ends 223 of the two conductive plugs 22 which extend into the connecting cavity 21. Moreover, the connecting cavity 21 is a grid-like structure woven from copper wires, and the conductive plug 22 are connected to the connecting cavity 21 by crimping or welding. In other embodiments, the copper wires may be replaced by other conductive wires and conductive tapes. The connecting cavity 21 may also be formed by stretching a metal conductive tape. The conductive plug 22 is a conductive metal column, such as a copper protruding column.

An outer surface of the conductive plug 22 is provided with a sealing annular groove array composed of a sealing annular groove 221 and a spring annular groove array composed of a spring annular groove 222. The sealing annular groove 221 is located between the spring annular groove 222 and the connecting cavity 21, and provided with a separable sealing ring 5 therein. The spring annular groove 222 is provided with a separable annular conductive springs 3 therein. The conductive spring 3 is a silver plated spring to provide electrical conductivity. The sealing ring 5 is used to protect the conductive springs 3. The number of the seal annular groove 221 and the spring annular groove 222 may be arbitrarily increased or decreased to meet requirements for different electrical connection.

The connecting bases 4 are located at two sides of the connector 2. Each of the connecting bases 4 includes a columnar base body 40. The base body 40 defines a cylindrical base cavity 41 having a space for receiving the inserted conductive plug 22 and contacting the conductive spring on the outer surface of the conductive plug 22 to form electrical connection between the connecting base and the conductive plug 22.

Figure 7:
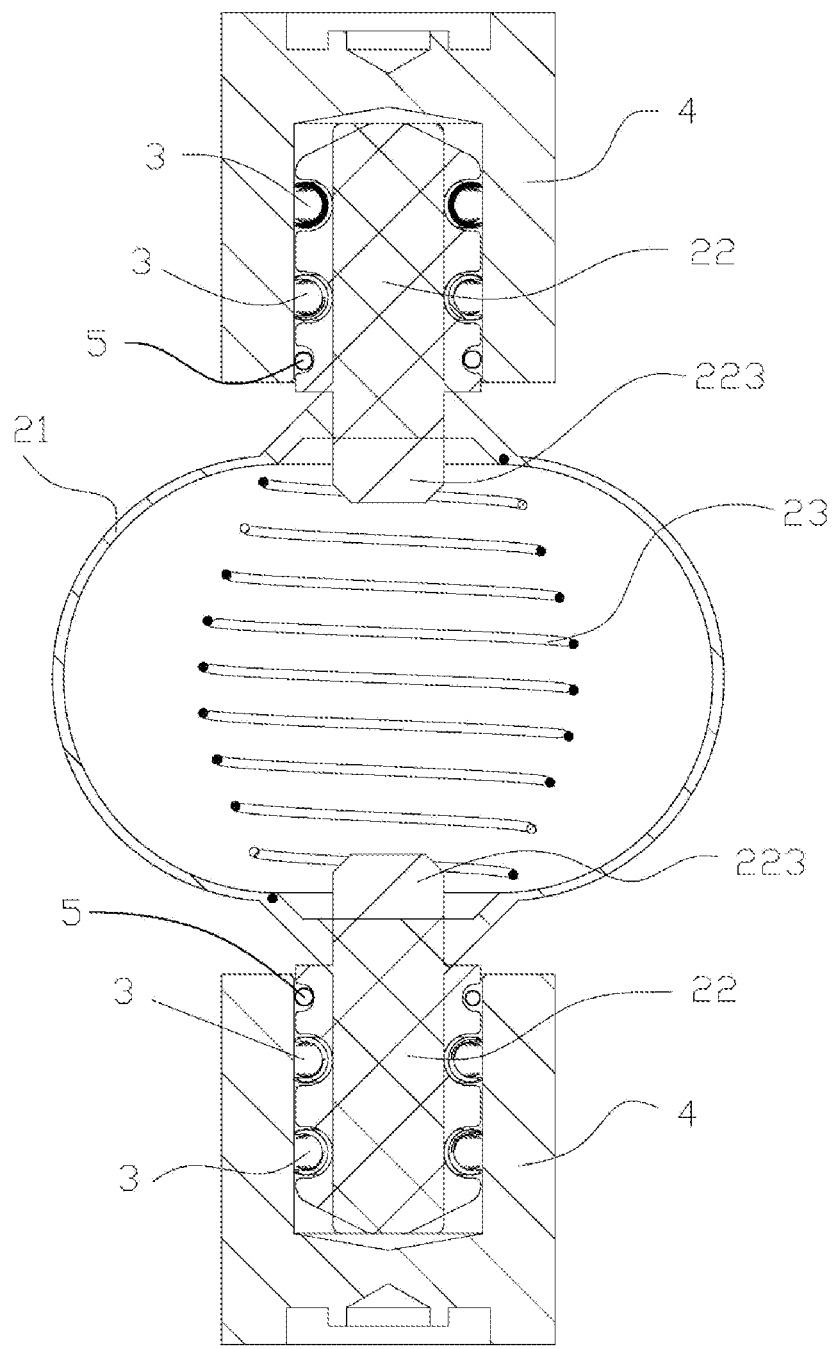
FIG. 7 is a schematic view (also sectional view) showing connection of the electrical connection device in FIG. 1.

As illustrated in FIG. 7, the conductive plugs 22 at both ends of the connector 2 are directly inserted into the base cavity 41 of the corresponding connecting base 4 in use. At this time, the outer walls of the conductive spring 3 and the sealing ring 5 abut against an inner wall of the base cavity 41, thereby providing a reliable electrical and sealing connection for different connecting bases.

Figure 8:
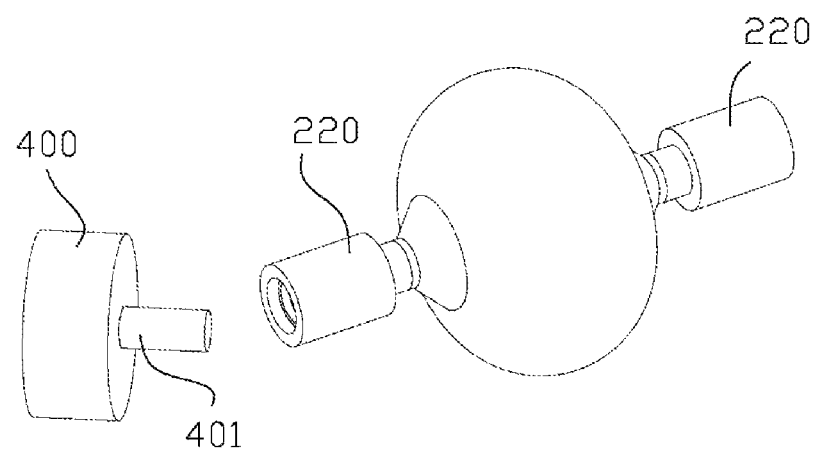
FIG. 8 is a perspective view of an electrical connection device according to another embodiment of the present disclosure.

In another embodiment of the present disclosure, a cylindrical conductive plug instead of the columnar conductive plug is used in another embodiment. As shown in FIG. 8, the conductive plug 220 is cylindrical and defines a spring annular groove and a sealing annular groove on an inner wall thereof. The conductive spring and the sealing ring are respectively disposed on the inner wall of the cylindrical conductive plug 220 by the spring annular groove and the sealing annular groove. A connecting base body 400 is provided with a protruding column 401 which is inserted into the conductive plug 220. At this time, an outer wall of the protruding column 401 abuts against the conductive spring and the sealing ring on the inner wall of the cylindrical conductive plug 220, such that a good electrical connection is formed between the connecting base and the connector.

The electrical connection device of the present disclosure is suitable for installation in a small space, and can be elongated or compressed during installation. The installation is convenient and 360° follow-up, deviation and compression may be realized and after the installation. Electrical connection with good reliability can be achieved without bolts. Since the connecting cavity is woven from copper wires which have soft texture and good electrical conductivity, the electrical connection device is especially suitable for electrical connection between two sockets under severe industrial and mining conditions.

It should not be limited thereto. Any changes or alternatives without inventive work shall all be included in the scope of the present disclosure. Therefore, the scope of the disclosure should be determined by the scope of the disclosure as defined by the claims.

What is claimed is:

1. An electrical connection device, comprising:
   a connector having a hollow connecting cavity formed by a plurality of flexible conductive materials, and each of two opposite sides of the hollow connecting cavity being connected to a conductive plug electrically coupled with the hollow connecting cavity; wherein one end of the conductive plug extends into the hollow connecting cavity, and a spring is disposed between ends of two conductive plugs extending into the hollow connecting cavity,
   wherein the hollow connecting cavity is a spherical-like elastic hollow connecting cavity surrounded by the plurality of flexible conductive materials; and
   wherein the conductive plug is a columnar conductive plug or a cylindrical conductive plug, an outer wall of the columnar conductive plug defines one or more spring annular grooves provided with a separable annular conductive spring therein, an inner wall of the cylindrical conductive plug defines one or more spring annular grooves provided with a separable annular conductive spring therein.

2. The electrical connection device according to claim 1, wherein the hollow connecting cavity is a spherical-like elastic hollow connecting cavity surrounded by a grid-like flexible conductive material.

3. The electrical connection device according to claim 1, wherein the hollow connecting cavity is interwoven from metal wires or formed by stretching a metal conductive tape.

4. The electrical connection device according to claim 1, wherein the hollow connecting cavity is electrically connected to the conductive plug by crimping or welding.

5. The electrical connection device according to claim 1, wherein the spring is a compression spring.

6. The electrical connection device according to claim 1, wherein the conductive plug is a columnar conductive plug or a cylindrical conductive plug, an outer wall of the columnar conductive plug defines one or more spring annular grooves provided with a separable annular conductive spring therein, an inner wall of the cylindrical conductive plug defines one or more spring annular grooves provided with a separable annular conductive spring therein.

7. The electrical connection device according to claim 6, wherein the outer wall of the columnar conductive plug or the inner wall of the cylindrical conductive plug further defines one or more sealing annular grooves located between the one or more spring annular grooves and the hollow connecting cavity, and the one or more sealing annular grooves are provided with a separable sealing ring therein.

8. The electrical connection device according to claim 6, further comprising a pair of connecting bases located at two sides of the connector, wherein each of the pair of connecting bases comprises a base body provided with a base cavity or a protruding column, the base cavity has a space for receiving the columnar conductive plug and is in contact with the conductive spring at the outer wall of the conductive plug, and the protruding column is inserted into the cylindrical conductive plug and is in contact with the conductive spring at the inner wall of the cylindrical conductive plug.

9. The electrical connection device according to claim 7, further comprising a pair of connecting bases located at two sides of the connector, wherein each of the pair of connecting bases comprises a base body provided with a base cavity or a protruding column, the base cavity has a space for receiving the columnar conductive plug and is in contact with the conductive spring at the outer wall of the conductive plug, and the protruding column is inserted into the cylindrical conductive plug and is in contact with the conductive spring at the inner wall of the cylindrical conductive plug.

10. The electrical connection device according to claim 1, wherein the hollow connecting cavity is a spherical-like elastic hollow connecting cavity surrounded by a grid-like flexible conductive material.

11. The electrical connection device according to claim 1, wherein the hollow connecting cavity is interwoven from metal wires or formed by stretching a metal conductive tape.

12. The electrical connection device according to claim 1, wherein the hollow connecting cavity is electrically connected to the conductive plug by crimping or welding.

13. The electrical connection device according to claim 1, wherein one end of the conductive plug extends into the hollow connecting cavity, and a spring is disposed between ends of two conductive plugs extending into the hollow connecting cavity.

14. The electrical connection device according to claim 13, wherein the spring is a compression spring.

15. The electrical connection device according to claim 1, wherein the outer wall of the columnar conductive plug or the inner wall of the cylindrical conductive plug further defines one or more sealing annular grooves located between the one or more spring annular grooves and the hollow connecting cavity, and the one or more sealing annular grooves are provided with a separable sealing ring therein.

16. The electrical connection device according to claim 1, further comprising a pair of connecting bases located at two sides of the connector, wherein each of the pair of connecting bases comprises a base body provided with a base cavity or a protruding column, the base cavity has a space for receiving the columnar conductive plug and is in contact with the conductive spring at the outer wall of the conductive plug, and the protruding column is inserted into the cylindrical conductive plug and is in contact with the conductive spring at the inner wall of the cylindrical conductive plug.

17. The electrical connection device according to claim 15, further comprising a pair of connecting bases located at two sides of the connector, wherein each of the pair of connecting bases comprises a base body provided with a base cavity or a protruding column, the base cavity has a space for receiving the columnar conductive plug and is in contact with the conductive spring at the outer wall of the conductive plug, and the protruding column is inserted into the cylindrical conductive plug and is in contact with the conductive spring at the inner wall of the cylindrical conductive plug.

18. An electrical connection device, comprising:
    a connector having a hollow connecting cavity formed by a plurality of flexible conductive materials, and each of two opposite sides of the hollow connecting cavity being connected to a conductive plug electrically coupled with the hollow connecting cavity; wherein one end of the conductive plug extends into the hollow connecting cavity, and a spring is disposed between ends of two conductive plugs extending into the hollow connecting cavity,
    wherein the conductive plug is a columnar conductive plug or a cylindrical conductive plug, an outer wall of the columnar conductive plug defines one or more spring annular grooves provided with a separable annular conductive spring therein, an inner wall of the cylindrical conductive plug defines one or more spring annular grooves provided with a separable annular conductive spring therein.

\* \* \* \* \*